(12) United States Patent
Kawaguchi et al.

(10) Patent No.: US 8,511,412 B2
(45) Date of Patent: Aug. 20, 2013

(54) FRAME STRUCTURE FOR MOUNTING BATTERY MODULE IN VEHICLE

(75) Inventors: Satoshi Kawaguchi, Takaoka (JP); Minoru Akai, Toyama-ken (JP); Akihiro Kosaki, Aichi-ken (JP)

(73) Assignees: Aisin Keikinzoku Co., Ltd. (JP); Toyota Jidosha Kabushiki Kaisya (JP)

( * ) Notice: Subject to any disclaimer, the term of this patent is extended or adjusted under 35 U.S.C. 154(b) by 0 days.

(21) Appl. No.: 13/338,640

(22) Filed: Dec. 28, 2011

(65) Prior Publication Data

US 2012/0125704 A1 May 24, 2012

Related U.S. Application Data

(63) Continuation of application No. PCT/JP2010/060946, filed on Jun. 28, 2010.

(30) Foreign Application Priority Data

Jun. 29, 2009 (JP) .................................. 2009-154430

(51) Int. Cl.
*B60R 16/04* (2006.01)

(52) U.S. Cl.
USPC ..................................................... 180/68.5

(58) Field of Classification Search
USPC .......... 180/68.5, 274, 291, 311, 312; 429/99, 429/61, 7, 100; 136/251, 244, 291
See application file for complete search history.

(56) References Cited

U.S. PATENT DOCUMENTS

| | | | | |
|---|---|---|---|---|
| 5,392,873 A * | 2/1995 | Masuyama et al. | ......... | 180/68.5 |
| 5,501,289 A * | 3/1996 | Nishikawa et al. | ......... | 180/68.5 |
| 6,085,854 A * | 7/2000 | Nishikawa | .................. | 180/68.5 |
| 6,402,229 B1 * | 6/2002 | Suganuma | .................... | 180/312 |
| 6,670,541 B2 * | 12/2003 | Nagao et al. | .................. | 136/251 |
| 7,128,999 B1 * | 10/2006 | Martin et al. | .................... | 429/99 |
| 7,614,469 B2 * | 11/2009 | Kumar et al. | ................. | 180/68.5 |
| 7,641,017 B2 * | 1/2010 | Nozaki et al. | .................. | 180/291 |
| 7,654,352 B2 * | 2/2010 | Takasaki et al. | ............. | 180/68.5 |
| 7,749,644 B2 * | 7/2010 | Nishino | ....................... | 429/100 |
| 8,051,934 B2 * | 11/2011 | Kiya et al. | ................... | 180/68.5 |
| 2005/0173170 A1 * | 8/2005 | Miyajima et al. | ........... | 180/68.5 |

FOREIGN PATENT DOCUMENTS

| | | |
|---|---|---|
| JP | 5-56546 | 7/1993 |
| JP | 9-156380 | 6/1997 |
| JP | 9-240288 | 9/1997 |
| JP | 2008-226610 | 9/2008 |
| JP | 2009-105007 | 5/2009 |
| JP | 2009-193942 | 8/2009 |

* cited by examiner

*Primary Examiner* — Hau Phan
(74) *Attorney, Agent, or Firm* — Harness, Dickey & Pierce, P.L.C.

(57) ABSTRACT

A pair of lateral side frames that are fixed along vehicle side members extending in a front-back direction of the vehicle on both sides of the vehicle in a width direction, a front frame that is fixed between front end parts of the lateral side frames, a rear frame that is fixed between rear end parts, and a base frame that is fixed between the front frame and the rear frame are provided. A front mounting frame for fixedly mounting the front side of a battery module on the front side of the base frame, and a rear mounting frame for mounting the rear side of the battery module on the rear side are provided respectively in the width direction of the vehicle.

4 Claims, 6 Drawing Sheets

FIG. 4B ENLARGED VIEW OF PART A

FIG. 6B ENLARGED VIEW OF PART B

US 8,511,412 B2

FRAME STRUCTURE FOR MOUNTING BATTERY MODULE IN VEHICLE

CROSS REFERENCE TO RELATED APPLICATION

This application is a continuation of International Patent Application No. PCT/JP2010/060946, having an international filing date of Jun. 28, 2010, which designated the United States, the entirety of which is incorporated herein by reference. Japanese Patent Application No. 2009-154430 filed on Jun. 29, 2009 is also incorporated herein by reference in its entirety.

BACKGROUND

The present invention relates to a frame structure for mounting a battery module in a vehicle, and more particularly, to a frame structure that can effectively achieve weight reduction.

In the field of an electric vehicle and a hybrid vehicle, it is necessary to mount a secondary battery module that can be repeatedly charged and discharged. As the secondary battery module, a nickel-cadmium battery cell, a nickel hydride battery cell, a lithium-ion battery cell, or the like may be employed.

In particular, in the electric vehicle, the on-board weight of the secondary battery cell needs to be increased so as to increase the travel distance.

However, if the on-board weight of the battery module is increased, it is necessary to reduce the weight of the frame for mounting the battery module in the vehicle since it becomes important to consider the weight balance when the frame is mounted in the vehicle.

JP-A-2008-226610 discloses a technology for mounting a battery cell in a floor panel arranged between side members in a trunk room, but is not relevant to a frame structure for mounting a battery module in a vehicle.

SUMMARY

According to one aspect of the invention, there is provided a frame structure for mounting a battery module in a vehicle, comprising:

a pair of left and right side frames that are fixed along vehicle side members extending in a front-back direction of the vehicle on both sides in a width direction of the vehicle;

a front frame that is fixed between front end parts of the left and right side frames;

a rear frame that is fixed between the rear end parts;

a base frame that is fixed between the front frame and the rear frame;

a front mounting frame that is extending in the width direction of the vehicle and fixedly carries a front side of the battery module on a front side of the base frame; and a rear mounting frame that is extending in the width direction of the vehicle and fixedly carries a rear side of the battery module on a rear side, each one of the pair of left and right side frames being manufactured from an aluminum extruded material, and integrally formed with a fixing bracket part that is fixed to one of the vehicle side members.

BRIEF DESCRIPTION OF THE DRAWINGS

FIG. 4B is an enlarged view of a part A;

FIG. 6B is an enlarged view of a B part.

DESCRIPTION OF EXEMPLARY EMBODIMENTS

Figure 1:
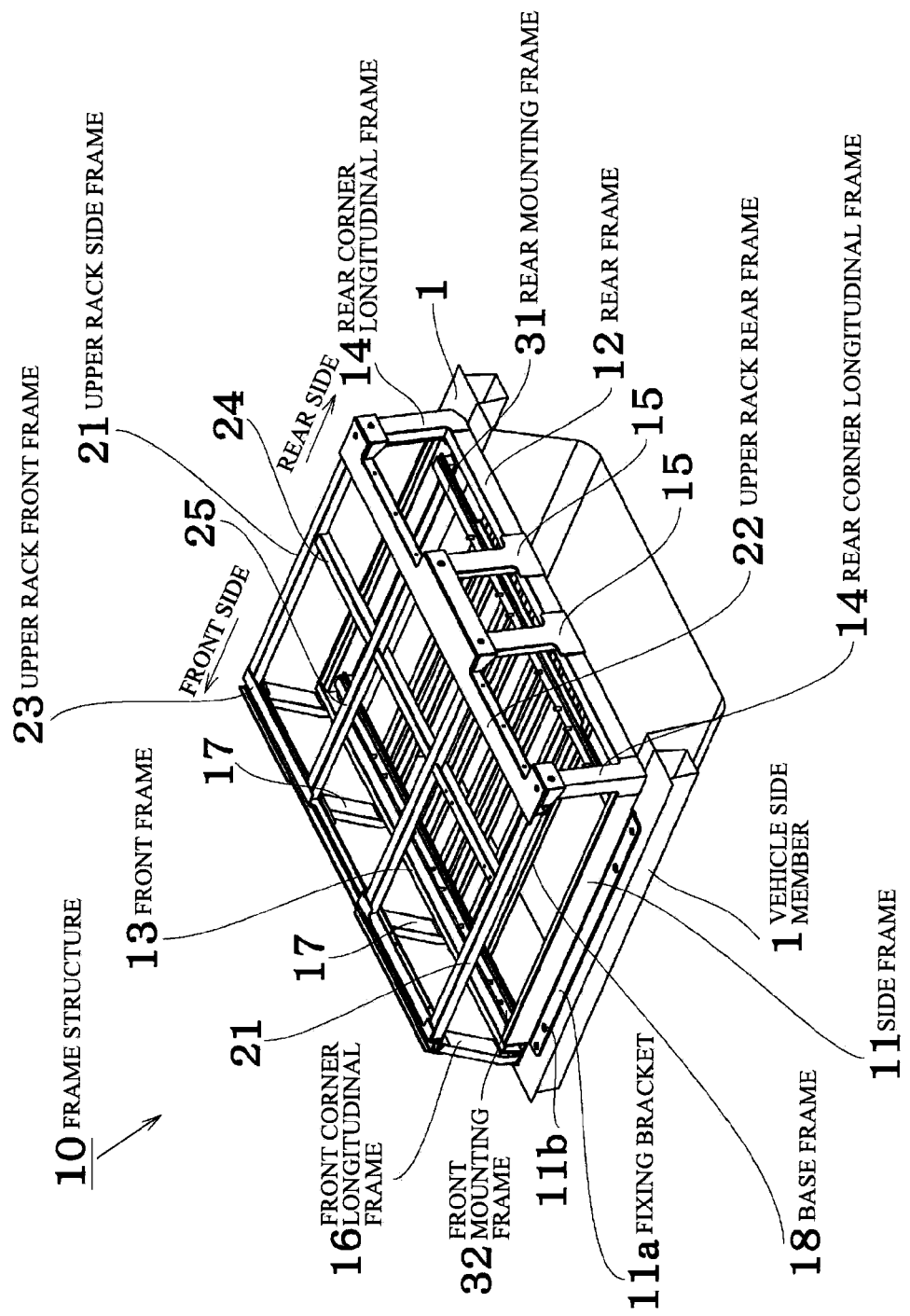
FIG. 1 is a perspective view seen from a rear side showing a state in which a frame structure according to the invention is fixed to a side member of a vehicle.

The invention may provide a frame structure for mounting a battery module in a vehicle, the frame structure being lightweight and excellent in rigidity.

A frame structure for mounting a battery module in a vehicle according to one embodiment of the invention comprises a pair of left and right side frames that are fixed along vehicle side members extending in a front-back direction of the vehicle on both sides in a width direction of the vehicle, a front frame that is fixed between the front end parts of the left and right side frames, a rear frame that is fixed between the rear end parts, a base frame that is fixed between the front frame and the rear frame, a front mounting frame that is extending in the width direction of the vehicle and fixedly carries the front side of the battery module on the front side of the base frame, and a rear mounting frame that is extending in the width direction of the vehicle and carries the rear side of the battery module on the rear side.

Here, the vehicle side member is intended to mean a framework member of the vehicle body.

In the present specification, the front side of a vehicle is referred to as a "front side", and the width direction of the vehicle is referred to as a "left and right direction".

Here, each one of the pair of left and right side frames may be manufactured from an aluminum extruded material, and may be integrally formed with a fixing bracket part that is fixed to one of the vehicle side members and carrying bracket parts that carry and install both end parts of the front frame and the rear frame.

Also, the front frame and the rear frame may be manufactured from an aluminum extruded material, and may be integrally formed with installation brackets that are fixed to both end parts of the base frame.

The frame structure according to an embodiment of the invention employs a frame structure in which a pair of left and right side frames provided in a front-back direction of the vehicle are fixed to side members, which are framework members of the vehicle body, extending in the front-back direction of the vehicle, left and right in relation to a width direction of the vehicle, a front frame extending in the width direction of the vehicle is fixed between the front end parts of the left and right side frames in the front-back direction, a rear frame extending in the width direction of the vehicle is fixed between the rear end parts of the left and right side frames, a base frame is fixed between the front frame and the rear frame in the front-back direction, a front mounting frame extending in the width direction of the vehicle is provided on the front side of the base frame, and a rear mounting frame extending in the width direction of the vehicle is provided on the rear side of the base frame. Accordingly, the load of a battery module mounted in the vehicle is transmitted as follows.

When the battery module is fixedly carried so as to form a bridge between the front mounting frame and the rear mounting frame, the load of the battery module is transmitted to the base frame supporting the front mounting frame and the rear mounting frame.

Hence, the load of the battery module transmitted to the base frame is transferred to the front frame and the rear frame supporting the base frame.

Since the front frame and the rear frame are supported by the left and right side frames, the load of the battery module is dispersed to each constituent frame, and thus, the total weight is supported by the vehicle side members.

In this manner, the load of the battery module which may even amount to several hundred kilograms is transmitted to each frame and then to the vehicle side members in a dispersed manner, thereby making it possible to acquire a frame structure excellent in rigidity while reducing the weight of the frame structure as a whole.

In the frame structure according to an embodiment of the invention, the side frame, the front frame, and the rear frame can be manufactured from an aluminum extruded material. The aluminum extruded material provides great flexibility in cross-sectional shape, enables the bracket part that connects frames to each other or fixes them to the side member to be formed integrally with the frame main body, and is inexpensive and more reliable in connection strength in comparison to butt welding.

An example of a frame structure for mounting a battery module in a vehicle according to an embodiment of the invention will be described hereinafter with reference to the drawings.

Figure 2:
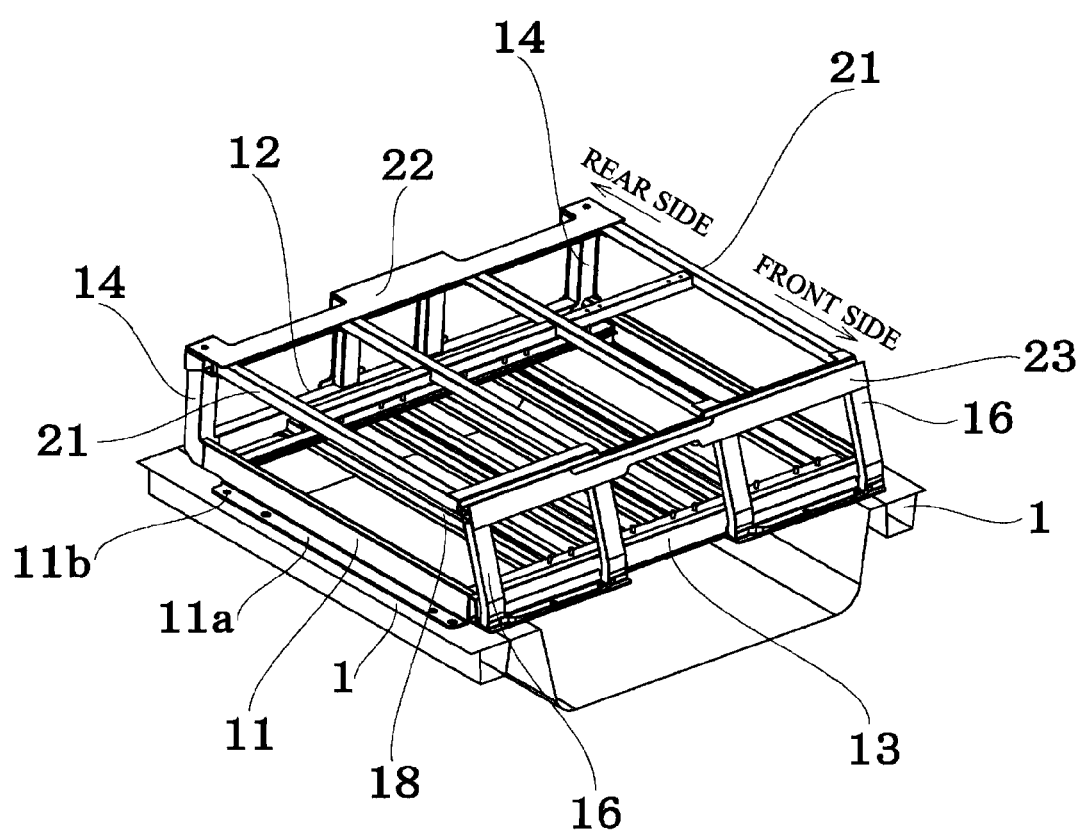
FIG. 2 is a perspective view seen from a front side showing a state in which the frame structure according to the invention is fixed to the side member of the vehicle.

FIGS. 1 and 2 show an example of mounting a frame structure according to an embodiment of the invention in the vicinity of a rear part (trunk room) of a vehicle.

A frame structure 10 is mounted to the vehicle side members 1, 1 respectively extending in a front-back direction of the vehicle, on both sides in the width direction of the vehicle.

FIG. 1 is a perspective view seen from a rear side of the vehicle when the frame structure 10 is mounted in the vehicle. On the other hand, FIG. 2 is a perspective view seen from a front side of the vehicle.

Figure 3:
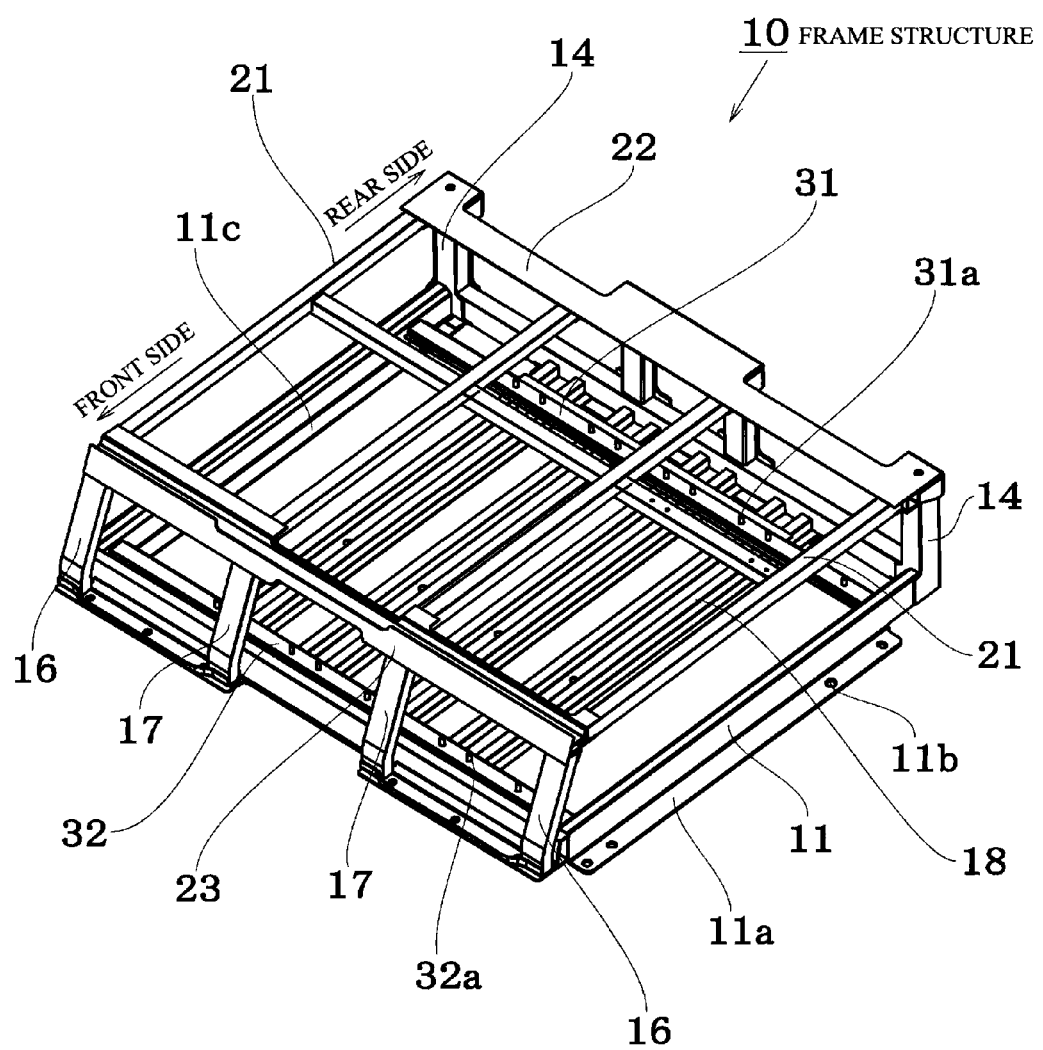
FIG. 3 is a perspective view of the frame structure alone.

FIG. 3 is a view showing the frame structure 10 alone.

Figure 4A:
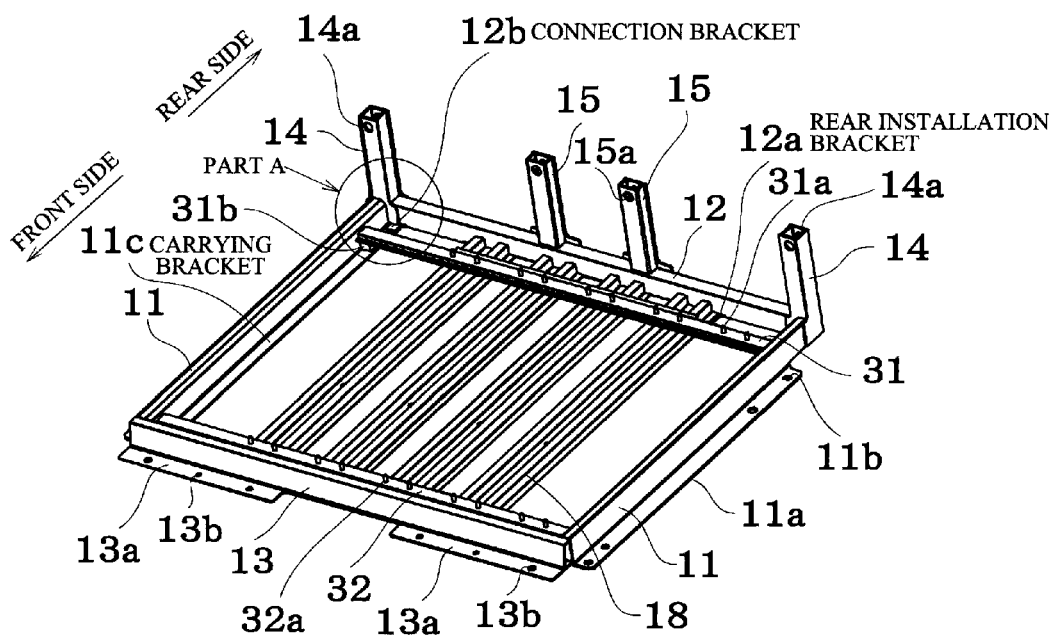
FIG. 4A is a view showing the frame structure in a state in which an upper rack is removed.
Figure 4A:
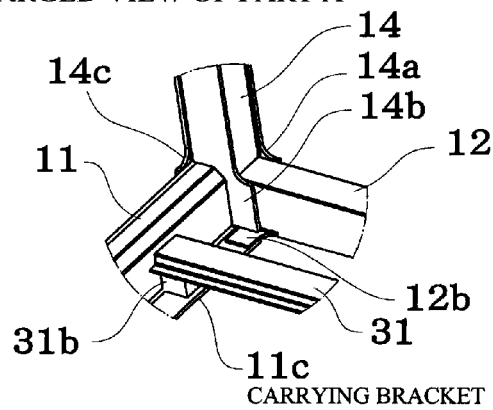
Figure 5:
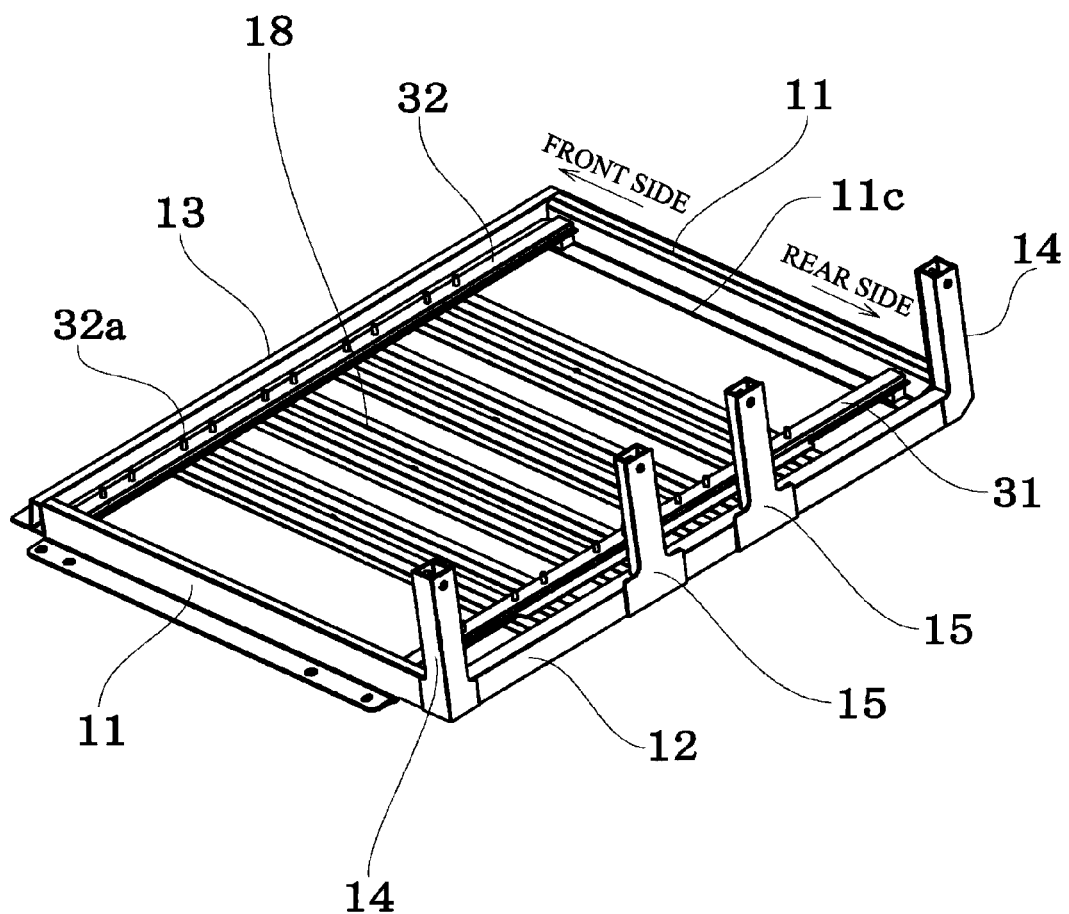
FIG. 5 is a perspective rear view seen from a rear side of a lower rack.

FIGS. 4A, 4B and 5 are views showing the frame structure 10 according to an embodiment of the invention, from which an upper rack part has been removed, for the purpose of illustration.

The frame structure 10 includes side frames 11, 11 to be mounted to side members 1, 1 of the vehicle.

The side frame 11 includes a fixing bracket 11a to be mounted in a front-back direction along the side member 1 in the front-back direction of the vehicle, and can be fixed to the side member 1 through a mounting hole 11b or the like formed with the fixing bracket.

A front frame 13 is installed on the front end parts of the side frames 11 so as to form a bridge between the left and right side frames.

On the other hand, a rear frame 12 is installed on the rear end parts of the side frames 11 so as to form a bridge between the left and right side frames.

The side frame, the front frame, and the rear frame are manufactured from an aluminum extruded material.

Firstly, an installation connection structure between the side frame 11 and the rear frame 12 will be described hereinafter.

As shown in an enlarged view of a part A of FIG. 4B, a carrying bracket 11c integrally formed with the inside of the side frame 11 by extrusion is provided. A connection bracket 12b integrally formed with the rear frame 12 is carried as if stacked on the carrying bracket 11c, and then, the connection bracket 12b is welded to the carrying bracket 11c.

Meanwhile, the corner parts of the side frame 11 and the rear frame 12 are welded side by side with weld brackets 14b, 14c integrally formed with a rear corner longitudinal frame 14.

Figure 6A:
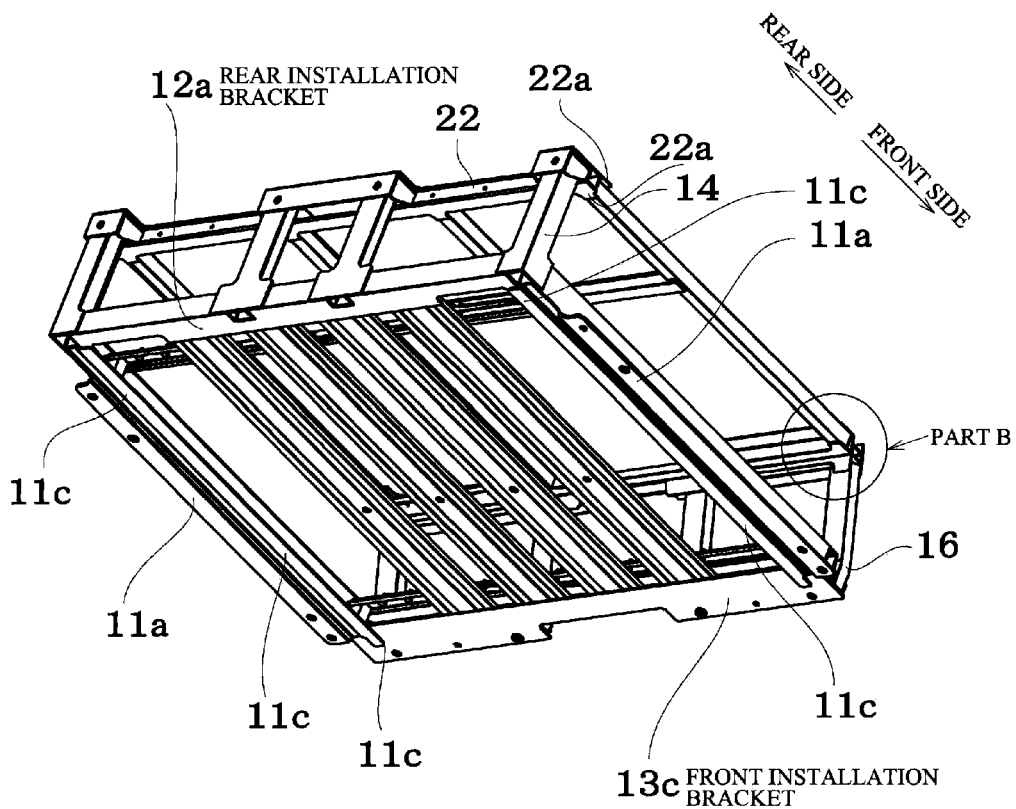
FIG. 6A is a perspective view of the frame structure seen from below.

Also, at the corner parts of the side frame 11 and the front frame 13, a front installation bracket 13c protruding toward the inside of the front frame 13 is carried on the carrying bracket 11c of the side frame 11, and the connections between the brackets are welded as shown in a perspective view seen from the bottom side of the frame structure 10 of FIG. 6A.

Figure 6A:
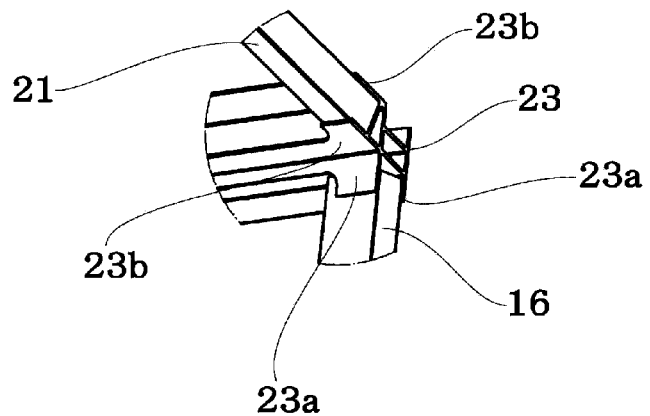

The rear frame 12 includes a rear installation bracket 12a protruding toward the inside as shown in FIG. 4A and FIG. 6A, and the front frame 13 includes a front installation bracket 13c protruding toward the inside as shown in FIG. 6.A A plurality of base frames 18 are fixedly carried in the front-back direction so as to form a bridge between the rear installation bracket 12a and the front installation bracket 13c.

On the base frames 18, a front mounting frame 32 extending in the width direction of the vehicle is fixed at the front side, and a rear mounting frame 31 extending in the width direction of the vehicle is fixed on the base frames 18 at the rear side.

Meanwhile, the both end parts of the front mounting frame 32 and the rear mounting frame 31 may be fixed to the carrying brackets 11c of the side frames 11 through spacers.

A spacer 31b is used in an example of FIG. 4A.

A reinforcement longitudinal frame 15 is vertically installed in the rear frame 12 as required.

A battery module, not shown, is fixedly carried with fixing pins 31a, 32a in a state shown in FIG. 4A.

An upper rack is mounted thereon, and thus, the battery module is installed in the vehicle.

The upper rack is constructed as a rack body, in which left and right upper rack side frames 21 are connected to the upper rack front frame 23 on the front side thereof, and connected to the upper rack rear frame 22 on the rear side thereof, and, as required, reinforcement frames 24, 25 are connected in the front-back and width directions of the vehicle, and a cooling unit and the like are carried thereon.

The upper rack front frame 23 has already been connected with front corner longitudinal frames 16 and reinforcement longitudinal frames 17. The upper rack rear frame 22 is fastened by bolts to the upper parts of the rear corner longitudinal frames 14 and the reinforcement frames 15. The lower ends of the front corner longitudinal frames 16 and the reinforcement longitudinal frames 17 in a lower direction from the upper rack front frame 23 connected therewith are fixed to the connection brackets 13a of the front frame 13 by bolts or the like using mounting holes 13b.

An example of a method for connecting the upper rack front frame 23 to the upper rack side frame 21 is shown in an enlarged view of a part B of FIG. 6B.

The upper rack front frame 23 is manufactured from an aluminum extruded material, and welded in such a manner that the end part of the upper rack side frame 21 is enclosed between upper and lower weld brackets 23b integrally formed with the upper rack front frame 23.

Similarly, the upper rack front frame 23 and the front corner longitudinal frame 16 are connected by welding in such a manner that the end part of the front corner longitudinal frame 16 is enclosed between left and right weld brackets 23a formed with the upper rack front frame 23.

In this way, the connection strength of the corner connection part is enhanced.

Also, as shown in FIG. 6A, upper and lower weld brackets 22a are formed with the upper rack rear frame 22, and the end part of the upper rack side frame 21 is connected by welding in such a manner as to be enclosed therebetween.

INDUSTRIAL APPLICABILITY

The invention can be utilized to mount a heavy load such as a battery module in a vehicle of any kind.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention.

What is claimed is:

1. A frame structure for mounting a battery module in a vehicle, comprising:
    a pair of left and right side frames that are fixed along vehicle side members extending in a front-back direction of the vehicle on both sides in a width direction of the vehicle;
    a front frame that is fixed between front end parts of the left and right side frames;
    a rear frame that is fixed between rear end parts of the left and right side frames;
    a base frame that is fixed between the front frame and the rear frame;
    a front mounting frame that extends in the width direction of the vehicle and fixedly carries a front side of the battery module on a front side of the base frame; and
    a rear mounting frame that extends in the width direction of the vehicle and fixedly carries a rear side of the battery module on a rear side,
    each one of the pair of left and right side frames being an aluminum extruded material, and integrally formed with a fixing bracket part that is fixed to one of the vehicle side members and a carrying bracket, and
    both end parts of the front frame being mounted on and fixed to the carrying brackets of the pair of left and right side frames so as to form a bridge between the front end parts of the left and right side frames, and
    both end parts of the rear frame being mounted on and fixed to the carrying brackets of the pair of left and right side frames so as to form a bridge between the rear end parts of the left and right side frames.

2. The frame structure as defined in claim 1,
    the front frame and the rear frame being an aluminum extruded material, and integrally formed with installation brackets,
    both end parts of the base frame being mounted on and fixed to the installation brackets of the front and rear frames so as to form a bridge between the front and rear frames.

3. The frame structure as defined in claim 1, further comprising:
    an upper rack front frame;
    an upper rack rear frame;
    a pair of left and right upper rack side frames that are connected to the upper rack front frame at one end, and connected to the upper rack rear frame at an opposite end;
    front corner longitudinal frames that connect the front frame and the upper rack front frame; and
    rear corner longitudinal frames that connect the rear frame and the upper rack rear frame.

4. The frame structure as defined in claim 3, further comprising:
    front brackets that are formed on an upper side and a lower side of the upper rack front frame so as to be opposite to each other; and
    rear brackets that are formed on an upper side and a lower side of the upper rack rear frame so as to be opposite to each other,
    the one end of each of the pair of left and right upper rack side frames being disposed between the front brackets, and
    the opposite end of each of the pair of left and right upper rack side frames being disposed between the rear brackets.

* * * * *